(12) United States Patent
Yang et al.

(10) Patent No.: US 10,148,145 B2
(45) Date of Patent: Dec. 4, 2018

(54) ROTOR STRUCTURE OF WOUND ROTOR DRIVING MOTOR

(71) Applicant: Hyundai Motor Company, Seoul (KR)

(72) Inventors: Hong Seok Yang, Gyeonggi-do (KR); Sangjin Park, Gyeonggi-do (KR); Jungwoo Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 213 days.

(21) Appl. No.: 14/747,299

(22) Filed: Jun. 23, 2015

(65) Prior Publication Data
US 2016/0164357 A1    Jun. 9, 2016

(30) Foreign Application Priority Data
Dec. 3, 2014    (KR) .................. 10-2014-0172131

(51) Int. Cl.
| | |
|---|---|
| *H02K 3/52* | (2006.01) |
| *H02K 3/34* | (2006.01) |
| *H02K 3/24* | (2006.01) |
| *H02K 1/32* | (2006.01) |
| *H02K 9/02* | (2006.01) |

(52) U.S. Cl.
CPC .............. *H02K 3/24* (2013.01); *H02K 1/325* (2013.01); *H02K 3/527* (2013.01); *H02K 9/02* (2013.01)

(58) Field of Classification Search
CPC .......... H02K 1/325; H02K 3/24; H02K 3/527; H02K 9/02
USPC ......................................................... 310/59
See application file for complete search history.

(56) References Cited

U.S. PATENT DOCUMENTS

| 5,124,607 | A | * | 6/1992 | Rieber | ................... | H02K 3/493 |
|---|---|---|---|---|---|---|
| | | | | | | 174/DIG. 20 |
| 7,982,359 | B2 | * | 7/2011 | McCabe | ................ | H02K 1/325 |
| | | | | | | 310/269 |
| 2006/0261691 | A1 | * | 11/2006 | Minke | ..................... | H02K 3/527 |
| | | | | | | 310/71 |
| 2010/0320860 | A1 | * | 12/2010 | Patel | ....................... | H02K 3/527 |
| | | | | | | 310/194 |
| 2011/0140567 | A1 | * | 6/2011 | Horst | ..................... | H02K 1/148 |
| | | | | | | 310/216.114 |
| 2013/0154437 | A1 | * | 6/2013 | Kaiser | ...................... | H02K 1/24 |
| | | | | | | 310/216.114 |
| 2013/0207493 | A1 | * | 8/2013 | Kaiser | .................... | H02K 3/527 |
| | | | | | | 310/59 |

(Continued)

FOREIGN PATENT DOCUMENTS

| JP | 01-166447 U | 11/1989 |
|---|---|---|
| JP | 2008-160908 A | 7/2008 |

(Continued)

*Primary Examiner* — Alex W Mok
(74) *Attorney, Agent, or Firm* — Mintz Levin Cohn Ferris Glovsky and Popeo, P.C.; Peter F. Corless (57) ABSTRACT

A rotor of a wound rotor driving motor is provided. The rotor includes a rotor body that is rotatably installed with a predetermined air gap within a stator and in which a rotor coil is wound in a plurality of rotor teeth. A bobbin is fixed to the rotor body by the rotor coil disposed at opposing sides of an axial direction of the rotor body and supports the rotor coil. The rotor body forms a plurality of air movement passages that are opened to the exterior in an axial direction therein, and the bobbin forms a plurality of connection passage that are coupled to the air movement passages.

7 Claims, 6 Drawing Sheets

(56) References Cited

U.S. PATENT DOCUMENTS

| | | | | |
|---|---|---|---|---|
| 2013/0342071 | A1* | 12/2013 | Shim | H02K 3/527 |
| | | | | 310/220 |
| 2014/0091670 | A1* | 4/2014 | Chun | H02K 3/46 |
| | | | | 310/214 |
| 2014/0368068 | A1* | 12/2014 | Birolleau | H02K 3/527 |
| | | | | 310/66 |

FOREIGN PATENT DOCUMENTS

| JP | 4275482 B2 | 6/2009 |
|---|---|---|
| KR | 20-0360456 Y1 | 8/2004 |
| KR | 10-1364028 B1 | 2/2014 |
| KR | 10-2014-0056534 A | 5/2014 |
| KR | 10-2014-0067345 A | 6/2014 |

\* cited by examiner

ROTOR STRUCTURE OF WOUND ROTOR DRIVING MOTOR

CROSS-REFERENCE TO RELATED APPLICATION

This application claims priority to and the benefit of Korean Patent Application No. 10-2014-0172131 filed in the Korean Intellectual Property Office on Dec. 3, 2014, the entire contents of which are incorporated herein by reference.

BACKGROUND (a) Field of the Invention

The present invention relates to a wound rotor driving motor and more particularly, to a rotor cooling structure of a wound rotor driving motor that cools a rotor coil with external air as an open structure of a non-molding method.

(b) Description of the Related Art

In general, a hybrid electric vehicle or an electric vehicle generates driving torque using an electric motor (hereinafter referred to as a "drive motor") that develops torque with electrical energy. For example, a hybrid electric vehicle may be driven in an electric vehicle (EV) mode, which is a pure electric vehicle mode where power of a drive motor is used, or in a hybrid electric vehicle (HEV) mode, where torques of an engine and a drive motor are simultaneously used as power. In other words, a general electric vehicle drives using a torque of a drive motor as power.

Typically, drive motors used as power sources of environmentally-friendly vehicles are permanent magnet synchronous motors (PMSMs). For example, PMSMs must maximize performance of permanent magnets to exhibit maximum performance in a restricted layout condition. In the permanent magnet, a neodymium (Nd) component enhances intensity of a permanent magnet, and a dysprosium (Dy) component enhances high temperature demagnetization tolerance. However, a rare earth (Nd, Dy) metal component of such a permanent magnet is limitedly buried, is very expensive, and may have severe price fluctuations. Accordingly, application of an induction motor has recently been considered, however, to exhibit the same motor performance, an excessive size increase in the volume and the weight thereof, is required.

Currently, development is occurring of a Wound Rotor Synchronous Motor (WRSM) to replace a Permanent Magnet Synchronous Motor (PMSM) as a drive motor used as a power source of an environmentally-friendly vehicle. By forming a rotor in an electromagnet when applying a current by winding a coil in a rotor and a stator, a WRSM replaces a permanent magnet of a PMSM. In such a WRSM, the rotor is disposed at a predetermined air gap within the stator. When power is applied to a coil of the stator and the rotor, a magnetic field is formed, and the rotor rotates by a magnetic action occurring therebetween. Unlike a PMSM, the WRSM winds a coil to a rotor when the rotor rotates at a high speed (e.g., in a normal EV, about 10,000 rpm or greater), a rotor coil may be separated by centrifugal force. To prevent such an occurrence, in the related art, an end coil cover is mounted within opposing end portions of a rotor, and by molding a resin within the end coil cover, a rotor coil is fixed.

Further, a WRSM has a structure in which a rotor is disposed at a predetermined air gap within a stator and may generate a magnetic flux by applying a current to a rotor coil through a brush and a slip ring. Accordingly, in a WRSM, copper loss occurs by resistance of a rotor coil, and which causes performance of a motor to deteriorate by causing heating of the rotor coil.

The above information disclosed in this section is merely for enhancement of understanding of the background of the invention and therefore it may contain information that does not form the prior art that is already known in this country to a person of ordinary skill in the art.

SUMMARY

The present invention provides a rotor of a wound rotor driving motor for moving external air in an axial direction as an open structure of a non-molding method in which an end coil cover may be eliminated and efficiently cooling heat occurring in a rotor coil.

According to an exemplary embodiment of the present invention, a rotor of a wound rotor driving motor may include: a rotor body rotatably mounted within a stator with a predetermined air gap therebetween and having a plurality of rotor teeth on which a rotor coil may be wound; and bobbins disposed at opposing (e.g. both sides) axial sides of the rotor body, supporting the rotor coil, and fixed to the rotor body by the rotor coil.

Additionally, the rotor body may include a plurality of air movement passages that may be formed in the rotor body and may be opened to the exterior in an axial direction therein. Each of the bobbins may form a plurality of connection passages, each of the connection passages may communicate with a corresponding air movement passage. The rotor body may be formed in an open structure of a non-molding type by the bobbins. Each of the air movement passages may be formed between neighboring rotor teeth on which the rotor coil may be wound in the rotor body. The bobbin may include a plurality of a coil support portions that may support the rotor teeth and may radially partition the plurality of connection passages. The bobbin may be coupled to a wedge that supports the rotor coil between rotor teeth of the rotor body. The bobbin may be integrally formed with a wedge fixing portion coupled to the wedge.

Further, the bobbin may include a first support ring that supports an external circumference of opposing axial sides of the rotor body; a second support ring that supports a rotation shaft at a central portion of the rotor body; and a coil support portion that integrally couples the first and second support rings and that radially partitions the plurality of connection passages and supports the rotor coil in which the rotor coil is wound on the rotor teeth therebetween. The rotor body may include a wedge that may be mounted between rotor teeth and that supports the rotor coil.

A wedge fixing portion coupled to the wedge may be integrally formed at a support surface of the first support ring. The coil support portion may include a first coil support integrally coupled to the first and second support rings and supporting the rotor coil along a center direction of the rotor body; and a second coil support integrally coupled to the first support ring and the first coil support and supporting the rotor coil along an external circumference direction of the rotor teeth. The rotor body may be fixed using a retainer to a rotation shaft disposed at the central portion of the rotor body by a retainer.

In an exemplary embodiment of the present invention, by forming the connection passage that coupled to the air movement passage of the rotor body in the bobbin of opposing sides of the rotor body, external air may be moved in an axial direction of the rotor body as an open structure of a non-molding method, and heat occurring in the rotor coil may be efficiently discharged. Therefore, in an exemplary embodiment, a copper loss by resistance of the rotor coil 1 may be reduced, efficiency of a drive motor may increase, energy consumption of an environmentally-friendly vehicle may be enhanced, and durability of the drive motor may improve.

Further, in an exemplary embodiment the rotor coil may be cooled using external air in an open structure of a non-molding method that may eliminate an end coil cover and a resin that may be molded within the end coil cover, production cost may be reduced based on the elimination of the end coil cover and the molding resin. In addition, cooling performance of the rotor may be further enhanced with direct cooling of external air to the rotor coil.

Accordingly, in an exemplary embodiment, the number of components of an entire drive motor may be reduced and thus production cost of the drive motor can be reduced. Furthermore, in an exemplary embodiment of the present invention, while coupling the bobbin to end portions of opposing sides of the rotor body, the wedge fixing portion may be coupled to the wedge and thus an assembly process of an entire drive motor may be simplified.

BRIEF DESCRIPTION OF THE DRAWINGS

While the drawings are described in connection with what is presently considered to be exemplary embodiments, it is to be understood that the invention is not limited to the disclosed drawings.

DESCRIPTION OF SYMBOLS

1 . . . rotor coil
3 . . . rotation shaft
5 . . . retainer
10 . . . rotor body
11 . . . rotor teeth
13 . . . slot
17 . . . wedge
19 . . . wedge plate
31 . . . air movement passage
50, 150 . . . bobbin
51 . . . connection passage
53 . . . axial bore
61 . . . first support ring
62 . . . second support ring
63 . . . coil support portion
71 . . . first coil support
72 . . . second coil support
80 . . . rotor exterior cover
191 . . . wedge fixing portion

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, In order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provide herein are modified by the term "about."

Figure 1:
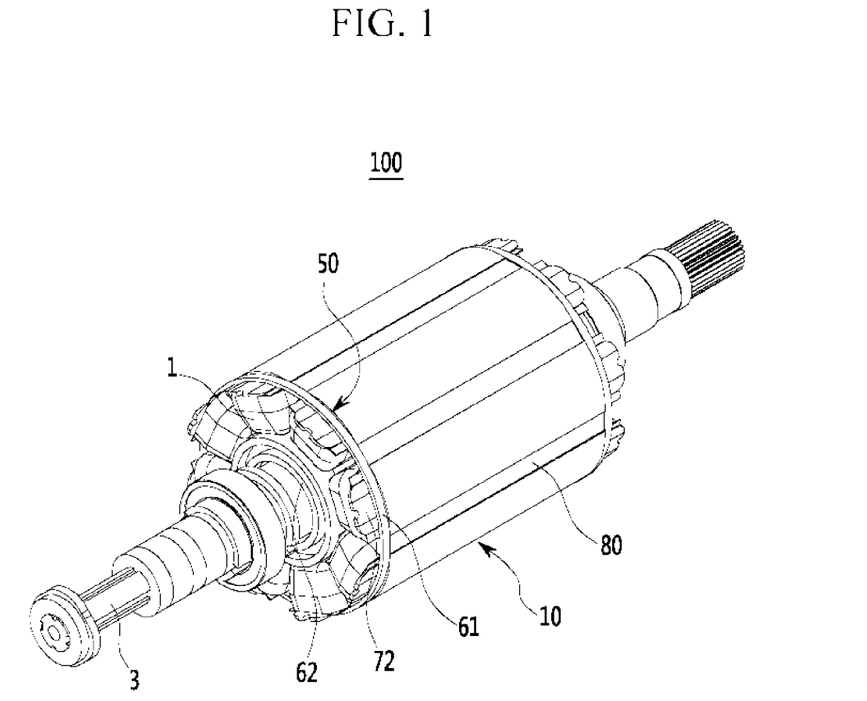
FIG. 1 is an exemplary embodiment of a coupled perspective view illustrating a rotor of a wound rotor driving motor according to an exemplary embodiment of the present invention.
Figure 2:
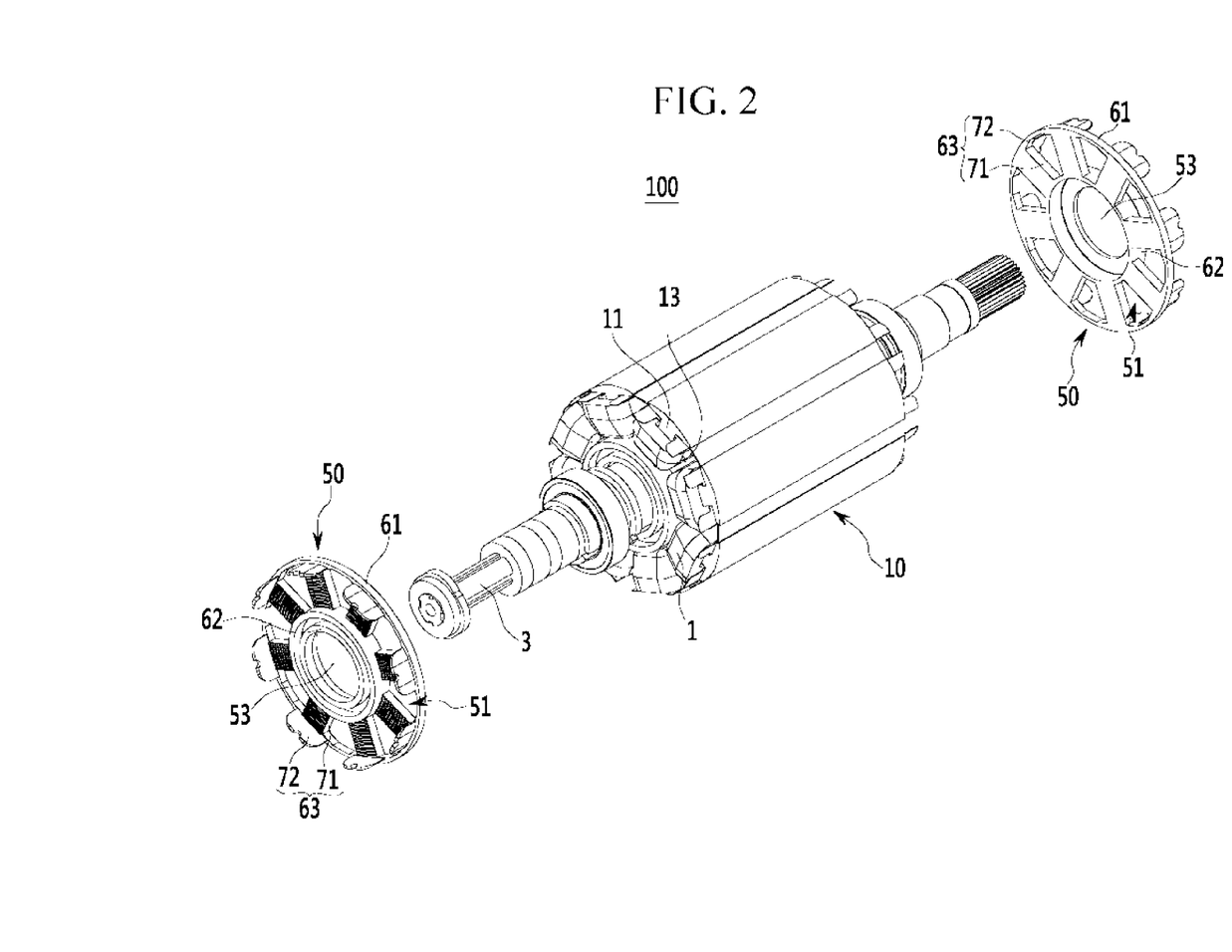
FIG. 2 is an exemplary embodiment of a partially detailed view illustrating a rotor of a wound rotor driving motor according to an exemplary embodiment of the present invention.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum). FIG. 1 is an exemplary embodiment of a coupled perspective view illustrating a rotor of a wound rotor driving motor according to an exemplary embodiment of the present invention, and FIG. 2 is an exemplary embodiment of a partially detailed perspective view illustrating a rotor of a wound rotor driving motor according to an exemplary embodiment of the present invention. Referring to FIG. 1 and FIG. 2, an exemplary embodiment may be applied to a wound rotor driving motor, and the wound rotor driving motor may be applied to an electric motion apparatus that may obtain a driving torque with electrical energy in an environmentally-friendly vehicle.

For example, the WRSM may include a stator (not shown) in which a stator coil (not shown) may be wound, and a rotor 100 according to an exemplary embodiment of the present invention in which a rotor coil 1 is wound and that is disposed within the stator. In the foregoing description, within the rotor 100, a rotation shaft 3 may be coupled to the central side thereof, and an exterior surface of the rotor 100 may be disposed within the stator at a predetermined air gap from an interior diameter surface of the stator.

Therefore, the WRSM may form the rotor 100 in an electromagnet when a current is applied by winding the rotor coil 1 in the rotor 100 as well as the stator, and may be configured to generate a driving torque with electromagnetic attraction and repulsive force between an electromagnet of the rotor 100 and an electromagnet of the stator. The rotor 100 of the wound rotor driving motor may have an open structure made with a non-molding method in which an end coil cover may be eliminated and may have a structure that may transport external air in an axial direction and to effectively cool heat occurring within the rotor coil 1. Accordingly, the rotor 100 of the wound rotor driving motor may include a rotor body 10 and a bobbin 50.

Figure 4:
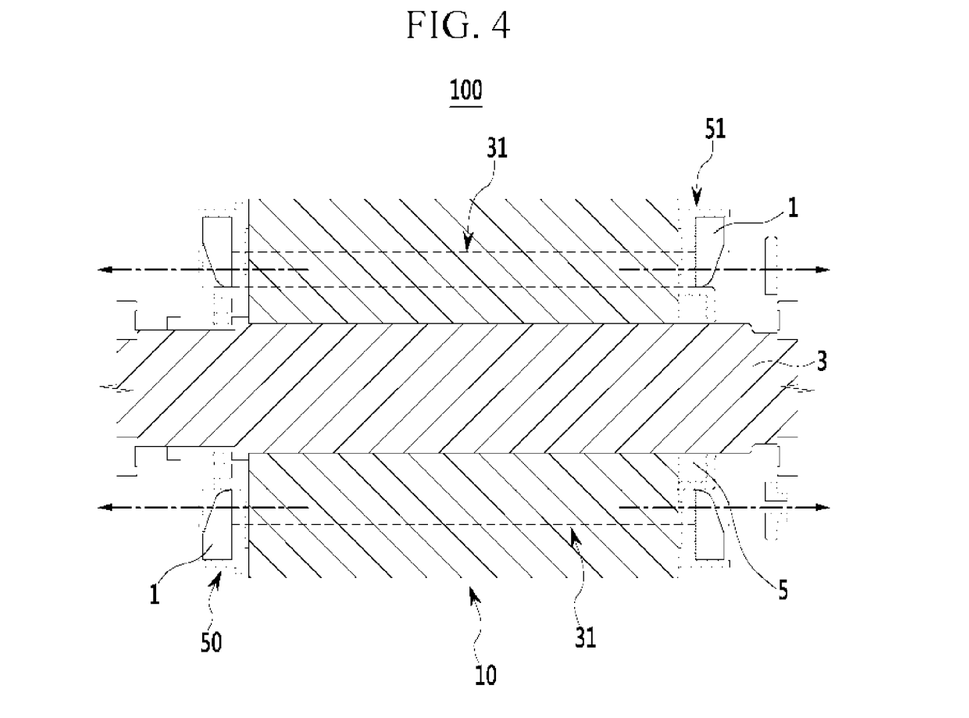
FIG. 4 is an exemplary embodiment of a side cross-sectional view illustrating a rotor of a wound rotor driving motor according to an exemplary embodiment of the present invention.

In an exemplary embodiment of the present invention, the rotor body 10 may be rotatably installed with a predetermined air gap inside of the stator (not shown). The rotation shaft 3 may be coupled in a central portion of the rotor body 10, as stated above. In addition, the rotor body 10 may be fixed using a retainer to the rotation shaft 3 disposed at the central portion of the rotor body 10 in an axial direction (5: FIG. 4 hereinafter). The retainer 5 may be configured as a retainer of an axial fixing structure generally known in the art, and thus the detailed description is omitted in the specification.

The rotor body 10 may include with a plurality of rotor teeth 11 which the rotor coil 1 may be wound. The rotor teeth 11 may be formed in an axial direction and may be separately disposed by a predetermined gap in a circumference direction (e.g. external circumference direction) of the rotor body 10. A slot 13 for winding the rotor coil 1 in the rotor teeth 11 may be formed between the rotor teeth 11. In other words, the rotor teeth 11 may be separately disposed by a predetermined gap in a circumference direction of the rotor body 10 while interposing the slots 13 therebetween.

Figure 3:
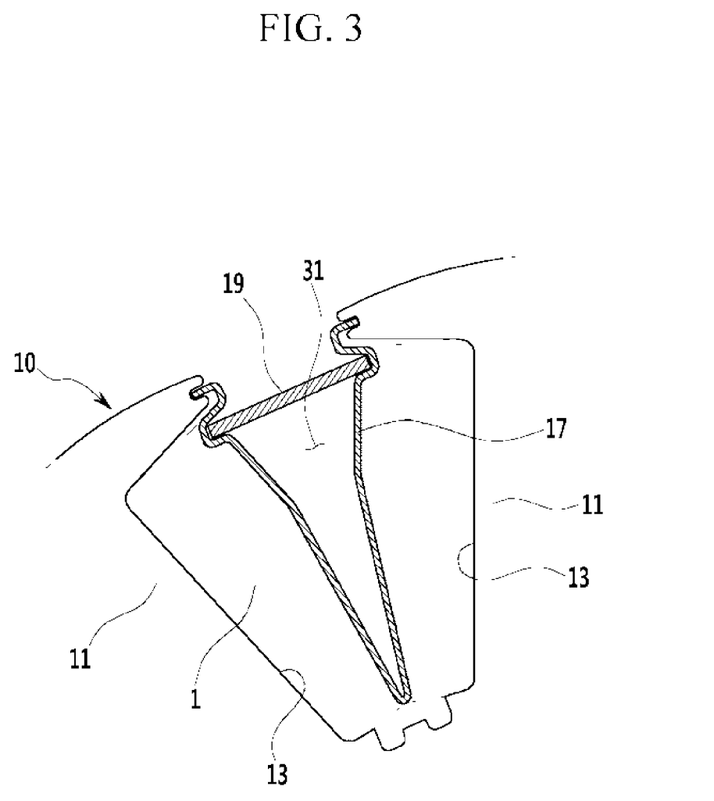
FIG. 3 is an exemplary embodiment of a diagram illustrating a rotor body applied to a rotor of a wound rotor driving motor according to an exemplary embodiment of the present invention.

FIG. 3 is an exemplary embodiment of a diagram illustrating a rotor body applied to a rotor of a wound rotor driving motor according to an exemplary embodiment of the present invention. Referring to FIG. 3, in the rotor body 10 according to an exemplary embodiment of the present invention, in the slots 13 between the rotor teeth 11, a wedge 17 may be mounted as a support structure for supporting the rotor coil 1 wound in the rotor teeth 11.

In particular, when the rotor body 10 rotates at a substantially high speed, the wedge 17 may secure insulation between the rotor coil 1 wound in the rotor teeth 11 while supporting a centrifugal force operating in the rotor coil 1. The wedge 17 may be installed in an axial direction within the slot 13 between the rotor teeth 11. Further, the wedge 17 may be inserted in an axial direction into the slot 13 between the rotor teeth 11, and may be coupled to the rotor teeth 11 as a sliding type. The wedge 17 may be made of an insulating material to provide insulation between the rotor coil 1 wound in the rotor teeth 11. Furthermore, the wedge 17 may have a surface that supports the rotor coil 1 in the slot 13 between the rotor teeth 11 and forms a predetermined space (e.g. cavity) in an axial direction to the inside. A separate wedge plate 19 for fixing the wedge 17 in an axial direction may be installed at opposing end sides of the rotor body 10. The wedge plate 19 may support the rotor teeth 11 at opposing end sides of the rotor body 10, and may be insertion coupled to opposing end portions of the wedge 17.

Reference numeral 80 as shown in the drawing, represents a rotor exterior cover that encloses the external circumference side of the rotor body 10. In an exemplary embodiment of the present invention, the rotor body 10 may be formed in an open structure of a non-molding type by the bobbins 50 to be described later, and may eliminate an end coil cover.

As shown in FIG. 4, the rotor body 10 may include a plurality of air movement passages 31 for transporting external air to the inside in an axial direction. As shown in FIGS. 3 and 4, the air movement passage 31 may be opened (e.g. coupled) to the exterior in an axial direction of the rotor body 10, and may be formed between the rotor teeth 11 in which the rotor coil 1 may be wound within the rotor body 10. For example, the air movement passage 31 may be formed within an internal space of the wedge 17 that may be installed within the slot 13 between the rotor teeth 11. In other words, the rotor body 10 may move external air along an internal space of the wedge 17 through the air movement passage 31.

Referring to FIGS. 1 and 2, in an exemplary embodiment of the present invention, the bobbin 50 may support the rotor coil 1 wound within the rotor teeth 11. The bobbin 50 may prevent the rotor coil 1 from being separated from the rotor teeth 11 by centrifugal force when the rotor body 10 rotates at a substainally high speed (e.g. in a normal EV, about 10,000 rpm or greater). Herein, the bobbin 50 may be made of an insulating material, it may be fixed to the rotor body 10, may be disposed at each of opposing sides of an axial direction of the rotor body, and may support the rotor coil 1.

In an exemplary embodiment of the present invention, in order to move external air to the air movement passage 31 (see FIG. 4) of the rotor body 10, each of the bobbins 50 may form a plurality of connection passages 51, each of the connection passages 51 being in communication with a corresponding air movement passage 31. For example, the bobbin 50 may be formed with a first portion that may support the end portions of opposing sides of the rotor body 10 and a second portion that may support the rotation shaft 3, and in the second portion, an axial bore 53 may be formed to which the rotation shaft 3 may be coupled. The plurality of connection passages 51 may be formed between the first portion and the second portion.

Particularly, the bobbin 50 may include a first support ring 61 as a first portion that may support end portions of opposing sides of the rotor body 10, and a second support ring 62 as a second portion that may support the rotation shaft 3. The first support ring 61 may have a substantially circular shape, and may support an external circumference of an end portion of opposing axial sides of the rotor body 10. The second support ring 62 may form the axial bore 53 and may support the rotation shaft 3 at a central portion of the rotor body 10. The bobbin 50 may integrally couple the first and second support rings 61 and 62 and radially partition the plurality of connection passages 51. The bobbin 50 may include a plurality of coil support portions 63 for supporting the rotor coil 1 wound on the rotor teeth 11 of the rotor body 10 therebetween.

The coil support portions 63 may support the rotor teeth 11 at opposing sides of an axial direction of the rotor teeth 11, and the rotor coil 1 may be wound within the rotor teeth 11. The coil support portions 63 may be integrally coupled to the first and second support rings 61 and 62. The coil support portions 63 may be radially disposed from a center point of the second support ring 62 to correspond with the rotor teeth 11. The coil support portions 63 may include first and second coil supports 71 and 72. The first coil support 71 may be integrally coupled to the first and second support rings 61 and 62. The first coil support 71 may two-dimensionally support the rotor coil 1 according to a center direction of the rotor body 10 at opposing sides of an axial direction of the rotor teeth 11. Further, the second coil support 72 may be integrally coupled to the first support ring 61 and the first coil support 71. The second coil support 72 may be formed to protrude from one end of first coil support 71 toward the axial direction proximate to the first support ring 61 that corresponds to an external circumference of the rotor teeth 11. The second coil support 72 may support the rotor coil 1 along an external circumference direction of the rotor teeth 11.

Hereinafter, operation of the rotor 100 of a wound rotor driving motor according to an exemplary embodiment having the foregoing configuration will be described. First, in an exemplary embodiment, when a current is applied to a stator coil of the stator and the rotor coil 1 of the rotor body 10, the rotor body 10 may rotate by a magnetic action occurring between the stator and the rotor body 10. For example, a copper loss may occur by resistance of the rotor coil 1, and thus heat occurs in the rotor coil 1. In such a process, the rotor body 10 may rotate, and the bobbin 50 mounted at opposing sides of an axial direction of the rotor body 10 may also rotate.

In an exemplary embodiment, within the rotor body 10, the air movement passage 31 may be formed in an axial direction, and since a plurality of connection passages 51 coupled to the air movement passage 31 may be formed within the bobbin 50, external air may be transported in an axial direction of the rotor body 10 through the air movement passage 31 and the connection passage 51. For example, external air as cooling air may be injected into the air movement passage 31 of the rotor body 10 (e.g., a first side) through the connection passage 51 of the bobbin 50 disposed at one side of the rotor body 10, and may be transported through the air movement passage 31. Further, the external air may be discharged through the connection passage 51 of the bobbin 50 disposed at the opposing side of the rotor body 10.

In other words, external air may be injected into the air movement passage 31 of the rotor body 10 through the connection passage 51 of the bobbin 50 disposed at opposing sides of the rotor body 10, and may be transported in opposing directions in an axial direction through the air movement passage 31. Therefore, in an exemplary embodiment, by transporting external air to the air movement passage 31 of the rotor body 10 through the connection passage 51 of the bobbin 50, heat generated in the rotor coil 1 may be discharged to the exterior and the rotor coil 1 may be rapidly cooled.

As described above, according to the rotor 100 of the wound rotor driving motor of an exemplary embodiment, by forming the connection passage 51 coupled to the air movement passage 31 of the rotor body 10 within the bobbin 50 of opposing sides of the rotor body 10, external air may be transported in an axial direction of the rotor body 10 as an open structure of a non-molding method, and heat generated within the rotor coil 1 may be efficiently discharged.

Thereby, in an exemplary embodiment, a copper loss by resistance of the rotor coil 1 may be reduced, and thus efficiency of a drive motor may be increased, energy consumption of an environmentally-friendly vehicle may be enhanced, and durability of the drive motor may be improved.

Further, in an exemplary embodiment the rotor coil 1 may be cooled using external air in an open structure of a non-molding method in which an end coil cover and a resin that is molded within the end coil cover may be eliminated, production cost may be reduced and cooling performance of the rotor may be further enhanced with direct cooling of external air to the rotor coil 1.

Figure 5:
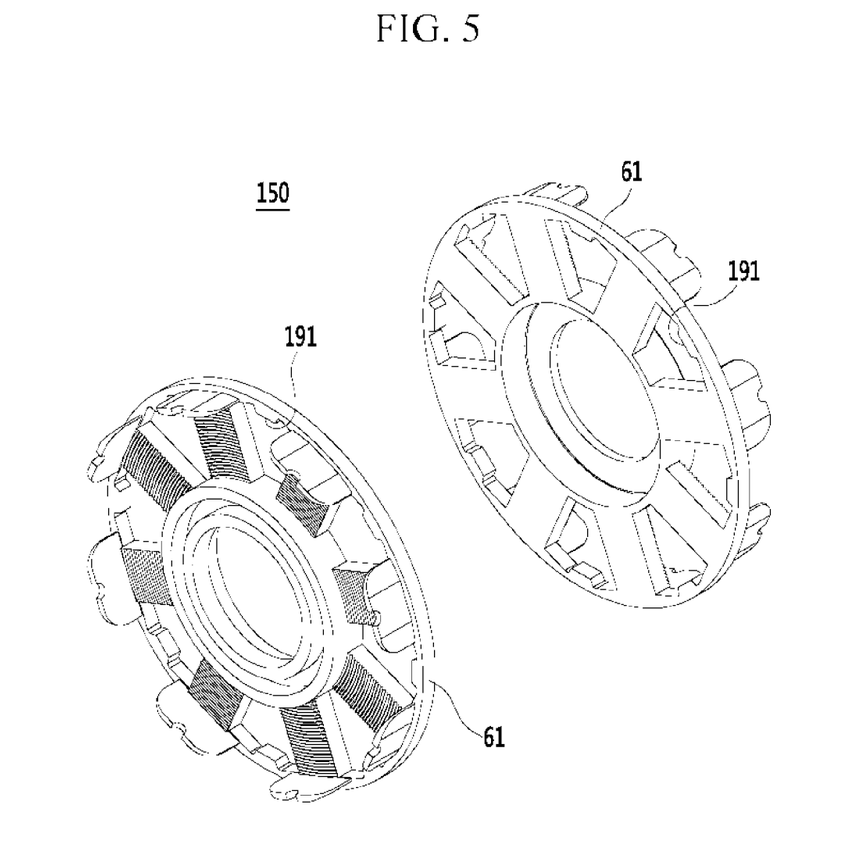
FIG. 5 is an exemplary embodiment of a perspective view illustrating an exemplary variation of a bobbin that is applied to a rotor of a wound rotor driving motor according to an exemplary embodiment of the present invention.
Figure 6:
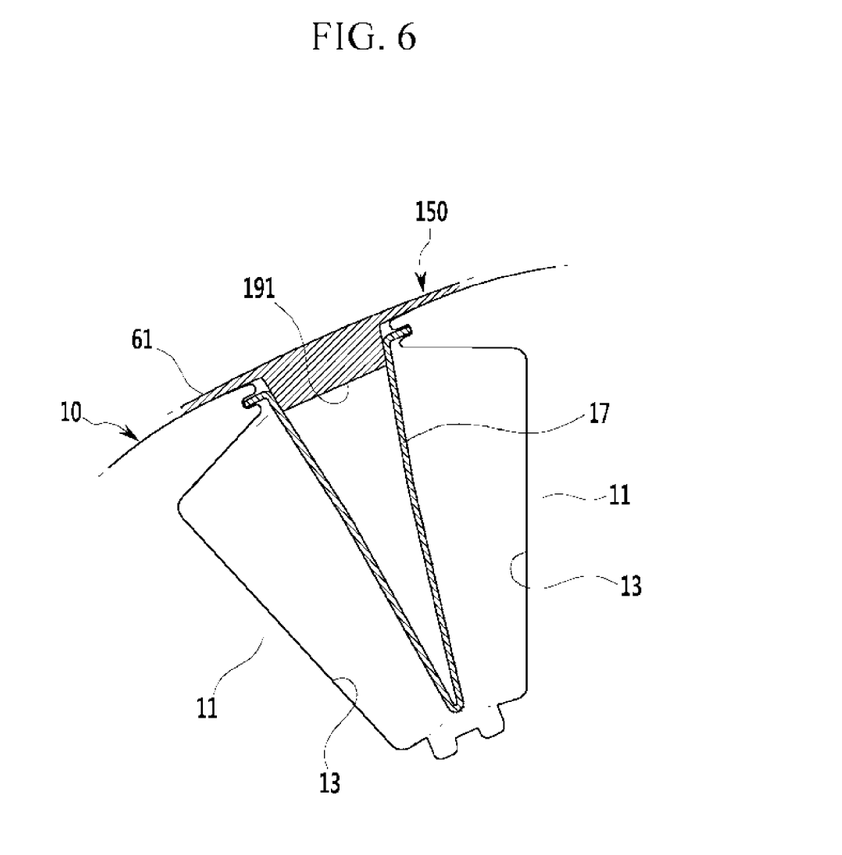
FIG. 6 is an exemplary embodiment of a partial cross-sectional view illustrating an exemplary variation of a bobbin that is applied to a rotor of a wound rotor driving motor according to an exemplary embodiment of the present invention.

FIG. 5 is an exemplary view illustrating an exemplary variation of a bobbin that is applied to a rotor of a wound rotor driving motor according to an exemplary embodiment, and FIG. 6 is an exemplary partial cross-sectional view illustrating an exemplary variation of a bobbin applied to a rotor of a wound rotor driving motor according to an exemplary embodiment. Referring to FIGS. 5 and 6, an exemplary variation of a bobbin 150 according to an exemplary embodiment may eliminate a separate wedge plate for fixing a wedge 17 in an axial direction of a rotor body 10 and may integrally form a wedge fixing portion 191 coupled to the wedge 17.

For example, the wedge fixing portion 191 may be integrally formed at an interior circumference surface of the bobbin 150, (i.e., a support surface that supports an external circumference of an end portion of opposing sides of the rotor body 10) to correspond to each of slots 13 between rotor teeth 11. In particular, the wedge fixing portion 191 may be formed to integrally protrude at a support surface of the first support ring 61 in the bobbin 150. The wedge fixing portion 191 may protrude in a quadrangular plate form, and may be insertion coupled to opposing end portions of the wedge 17 at opposing end sides of the rotor body 10. In other words, when coupling the bobbin 150 to each of end portions of opposing sides of the rotor body 10, the wedge fixing portion 171 may be inserted and coupled to opposing end portions of the wedge 17 between the rotor teeth 11. Therefore, in an exemplary embodiment, the wedge fixing portion 191 may be integrally formed within the end coil cover 150, a separate wedge plate for fixing the wedge 17 in an axial direction of the rotor body 10 may be eliminated.

Accordingly, the number of components of an entire drive motor may be reduced and thus a production cost of the drive motor may be reduced. Further, while coupling the bobbin 150 to end portions of opposing sides of the rotor body 10, the wedge fixing portion 191 may be coupled to the wedge 17 and thus an assembly process of an entire drive motor may be simplified. The remaining configurations and operations of the bobbin 150 according to the present exemplary variation are the same as those of the foregoing exemplary embodiments, and thus a detailed description thereof will be omitted.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims. In addition, it is to be considered that all of these modifications and alterations fall within the scope of the present invention.

What is claimed is:
1. A rotor of a wound rotor driving motor, comprising:
a rotor body rotatably mounted within of a stator with a predetermined air gap therebetween and having a plurality of rotor teeth on which a rotor coil is wound; and
a plurality of bobbins disposed at opposing axial sides of the rotor body, to support the rotor coil and fixed to the rotor body, wherein the rotor body includes with a plurality of air movement passages formed in the rotor body and opened to the exterior in an axial direction therein, wherein each of the bobbins forms a plurality of connection passages, each of which communicates with a corresponding air movement passage, wherein a wedge is installed in an axial direction within a slot between the rotor teeth, is coupled to the rotor teeth as a sliding type, has a surface to support the rotor coil in the slot and forms a predetermined space in the axial direction to an inside, and is made of an insulating material for insulation between the rotor coil that is wound in the rotor teeth, and wherein a separate wedge plate for fixing the wedge in an axial direction is installed at both end sides of the rotor body, supports the rotor teeth at both end sides of the rotor body, and is insertion coupled to both end portions of the wedge.

2. The rotor of claim 1, wherein the rotor body is formed in an open structure of a non-molding type by the bobbins.

3. The rotor of claim 1, wherein each of the air movement passages is formed between neighboring rotor teeth on which the rotor coil is wound in the rotor body.

4. The rotor of claim 1, wherein the bobbin includes a plurality of coil support portions that support the rotor teeth and radially partition the plurality of connection passages.

5. The rotor of claim 1, wherein the bobbin includes:
a first support ring that supports external circumferences of opposing axial sides of the rotor body;
a second support ring that supports a rotation shaft at a central portion of the rotor body; and
a coil support portion that integrally connects the first and second support rings and radially partitions the plurality of connection passages and supports the rotor coil wound on the rotor teeth therebetween.

6. The rotor of claim 5, wherein the coil support portion includes:
a first coil support integrally coupled to the first and second support rings and supporting the rotor coil along a center direction of the rotor body; and
a second coil support integrally coupled to the first support ring and the first coil support and supporting the rotor coil along an external circumference direction of the rotor teeth.

7. The rotor of claim 1, wherein the rotor body is fixed using a retainer to a rotation shaft at the central portion of the rotor body by a retainer.

* * * * *